US005604491A

United States Patent [19]

Coonley et al.

[11] Patent Number: 5,604,491

[45] Date of Patent: Feb. 18, 1997

[54] PAGER WITH USER SELECTABLE PRIORITY

[75] Inventors: Gregory A. Coonley, Lake Worth; Harry H. Chow, Delray Beach; Suthirug N. Pisutha-Arnond, Boynton Beach, all of Fla.

[73] Assignee: Motorola, Inc., Schaumburg, Ill.

[21] Appl. No.: 427,121

[22] Filed: Apr. 24, 1995

[51] Int. Cl.$^6$ .......... H04Q 7/14

[52] U.S. Cl. .......... 340/825.44; 455/38.2; 455/38.4

[58] Field of Search .......... 340/825.44, 825.5, 340/311.1, 825.45; 379/56, 57; 455/38.2, 38.4

[56] References Cited

U.S. PATENT DOCUMENTS

| | | | |
|---|---|---|---|
| 3,976,995 | 8/1976 | Sebestyen | 340/825.44 X |
| 4,962,377 | 10/1990 | Wallace et al. | 340/825.44 |
| 5,012,234 | 4/1991 | Dulaney et al. | 340/825.44 |
| 5,032,835 | 7/1991 | DeLuca | 340/825.44 |
| 5,075,684 | 12/1991 | DeLuca | 340/825.44 |
| 5,311,570 | 5/1994 | Grimes et al. | 379/57 |

*Primary Examiner*—Edwin C. Holloway, III
*Attorney, Agent, or Firm*—Keith A. Chanroo

[57] ABSTRACT

A selective call receiving device (14) and method allows a user of the device to mark or identify a message as a priority message. A message identified as a priority is stored in a priority message list (52) for comparison to a message that is subsequently received by the device (14) to determine whether the received message is a priority message or not. If a controller (28) of the device (14) determines that a received message is a priority, then the controller (28) generates a priority response such as an audible and/or tactile alert.

16 Claims, 5 Drawing Sheets

PAGER WITH USER SELECTABLE PRIORITY

FIELD OF THE INVENTION

The present invention relates to a selective call receiving device and more particularly to a selective call receiving device that allows the user of the device to mark a message as a priority so that any time that the selective call receiving device subsequently receives that particular message, the user will be given a priority alert.

BACKGROUND OF THE INVENTION

Pagers are known for receiving messages that are identified as a priority by the caller or initiator of the message. One such system is described in U.S. Pat. No. 4,438,433 as having multiple addresses or subscriber numbers, at least one of which is an emergency number or address. Incoming signals are decoded by the pager to obtain the page information contained therein which will include a pager address and a message. Once the signal is decoded, the pager determines if the received address matches one of the addresses of the pager indicating that the received page information is intended for that particular pager. If the received page information includes the emergency number or address, it is identified as a priority and an alert is generated. With this system, only the caller or page initiator can determine whether a message contained within the page information is a priority by calling the emergency number/address of the pager as opposed to calling the non-emergency number or address of the pager. The user of the pager described in this patent has no control over whether a particular message is to be treated as a priority or not. Another similar paging system is described in U.S. Pat. No. 4,959,648 wherein a selective call controller determines the priority of calls to be transmitted to a selective call receiver having two addresses. The pager will respond to pages to the first address with a loud audible tone while responding to pages to the second address by a silent vibration for example. Again, with this system, the user of the pager has no control over whether a particular message is to be treated as a priority or not.

SUMMARY OF THE INVENTION

In accordance with the present invention, the disadvantages of prior pagers have been overcome. The selective call receiving device of the present invention allows the user of the device to mark a message as a priority so that when a message matching a marked message is subsequently received, the device will provide a priority response.

More particularly, the selective call receiving device of the present invention includes a receiver for receiving messages. The device also includes a memory for storing a list of priority messages. A key or the like on the selective call receiving device is operable by a user for adding a message to the priority message list. When an incoming message is received, the received message is compared to the list of priority messages to determine whether the received message is a priority. If the received messages is determined to be a priority message, a priority alert is generated to advise the user that a priority message has been received.

DESCRIPTION OF THE PREFERRED EMBODIMENT

Figure 1:
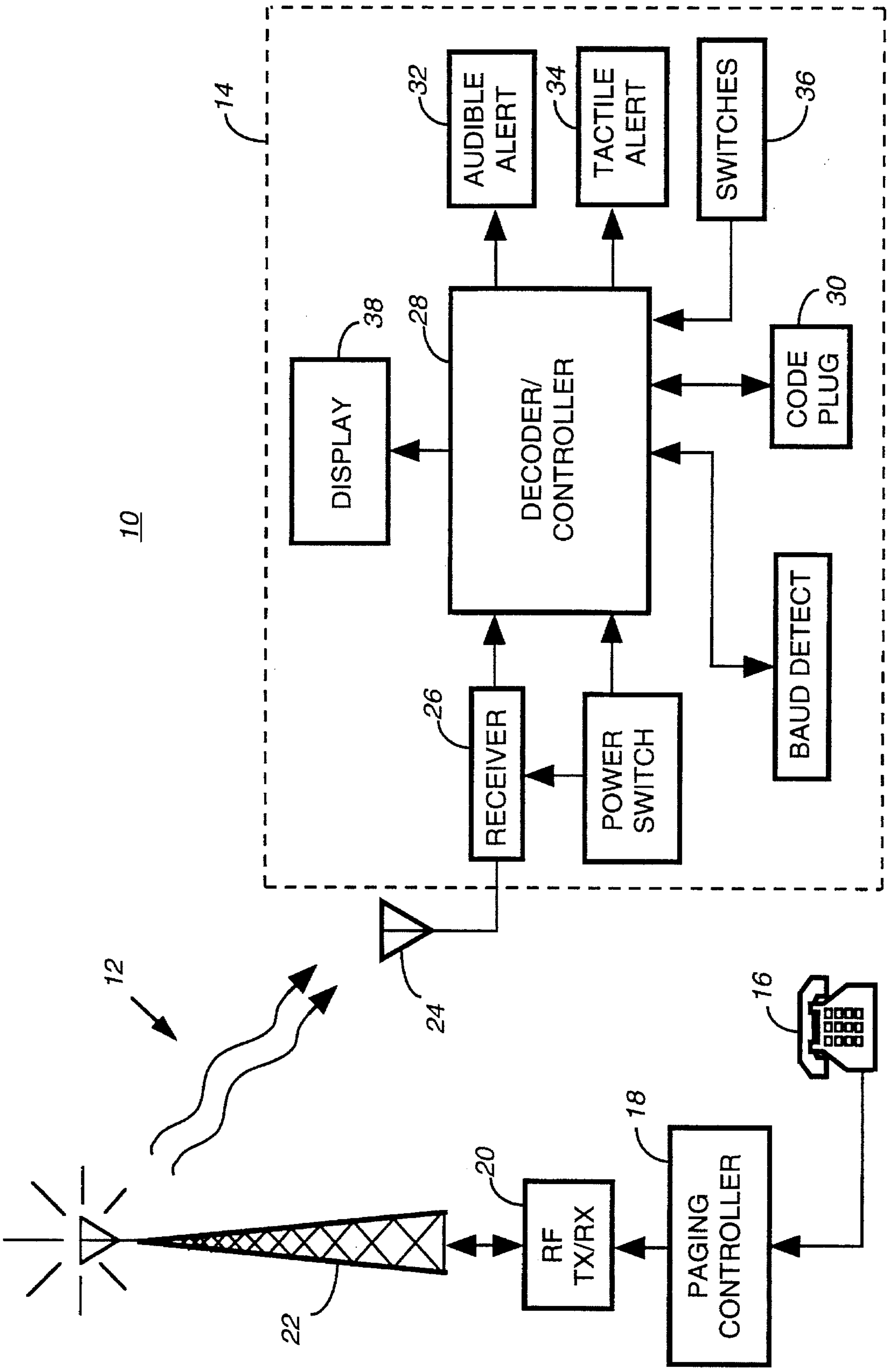
FIG. 1 is a block diagram of a paging system including a transmitter and a selective call receiving device in accordance with the preferred embodiment of the present invention.

A paging system 10, as shown in FIG. 1, includes a paging network 12 for transmitting radio frequency (RF) signals representing paging information, for example, to a selective call receiving device 14 such as a pager. The paging information of the signal includes an address identifying a particular selective call receiving device 14 as well as a paging message. The paging network 12 includes an input device, such as a telephone 16, for initiating pages and inputting messages to the network 12. A paging controller 18 generates page information in accordance with a particular signaling protocol such as the POCSAG (Post Office Code Standardisation Advisory Group) protocol. The paging controller 18 is coupled to a RF transmitter/receiver 20 that converts the page information to an RF signal and transmits the page information signal via an antenna 22.

The transmitted page information signal is received by the selective call receiving device 14 via an antenna 24 that is coupled to a receiver 26. The receiver 26 processes the received signal to produce a demodulated data stream that represents the page information signal. The demodulated data stream is then sent to the decoder/controller 28 for decoding the data stream into symbols such as 0, 1 for a two-level signal or 00, 01, 10 and 11 for a four-level signal. After decoding the demodulated data stream to obtain the address information and message information contained therein, the decoder/controller 28 compares the received address to one or more addresses stored in a code-plug (or code memory) 30 for the particular selective call receiving device 14 to determine whether the received signal was intended for the device 14. If a match is not detected, the remainder of the page information will be ignored. However, if a match is detected, the decoder/controller 28 will continue to process the remaining page information including the message contained therein.

Figure 2:
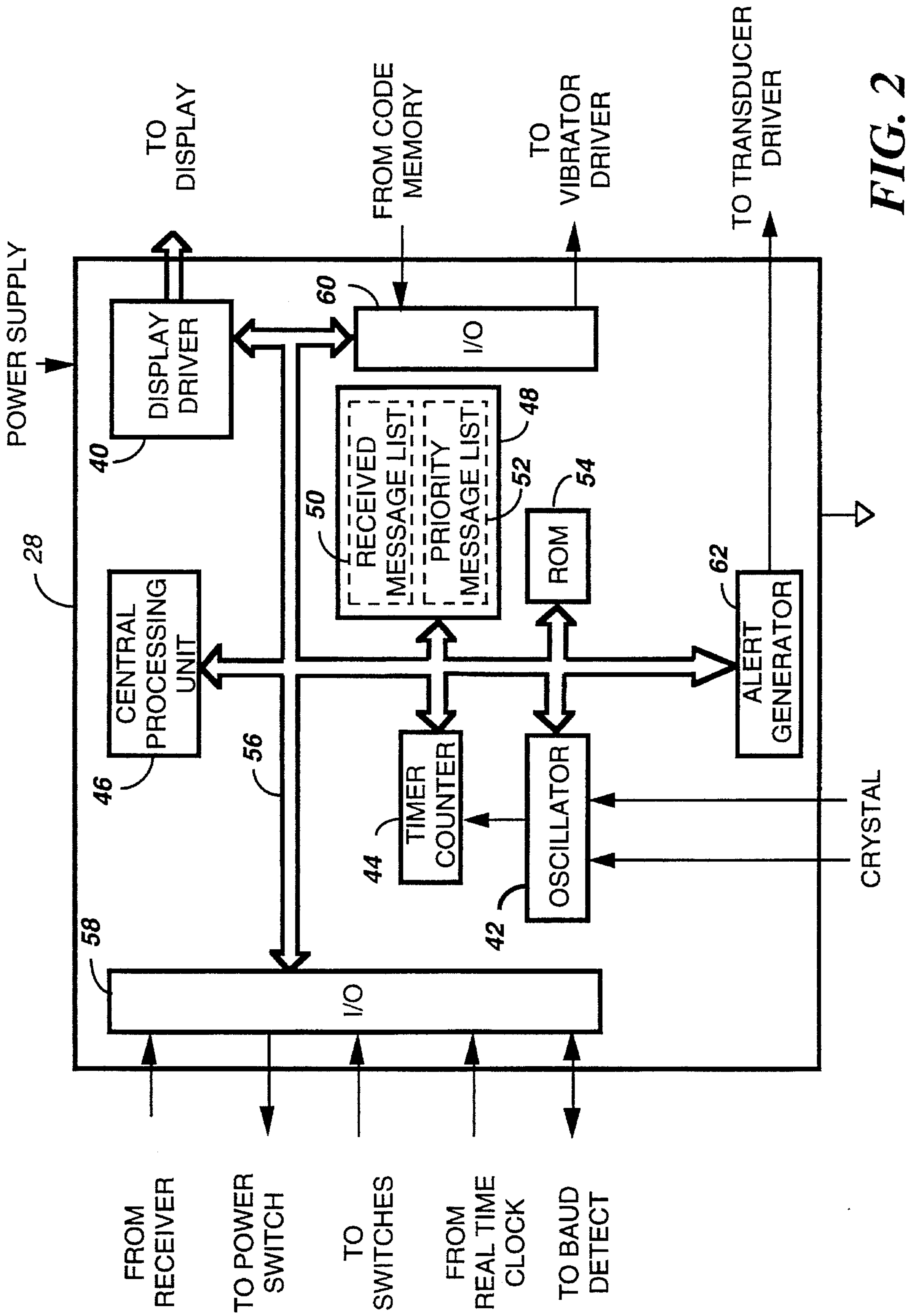
FIG. 2 is a block diagram of a decoder/controller of the selective call receiving device of FIG. 1.

The decoder/controller 28, as shown in FIG. 2, stores a received message in a Received Message List 50 of a RAM (random access memory) 48. In response to a determination that the received signal was intended for the device 14, the message 10 contained in the signal is compared to one or more priority messages stored in a Priority Message List 52. If a-match is found, the decoder/controller 28 produces a priority response. A priority response is a response that differs from a response produced when the received message is a standard, non-priority message. A priority response may be an audible alert generated by an audio alert generator 32 and/or a tactile alert generated by a tactile alert generator 34. Alternatively, a priority alert may be distinguished from a standard alert merely by changing the volume or cadence of the audible alert from the generator 32. A priority response may also be formed of a displayed indication distinguishable from a standard alert display indication. Alternatively, a priority response may merely change the order in which received messages are stored in the Received Message List 50.

The received messages that are stored in the RAM 48 can be accessed by the user for display using one or more of the keys or switches 36. Specifically, by selecting a read function via actuation of a switch 36, a received message is retrieved from the RAM 48 and processed by the decoder/controller 28 for display on a display 38 which may be an LCD (liquid crystal display) or the like. The switches 36 allow the user to select other functions of the selective call receiving device as will be apparent.

In accordance with the present invention, the contents of the Priority Message List 50 can be set by the user. For example, as described in detail below with respect to FIG. 3, the user may identify a message stored in the Received Message List 50 as a priority message by marking the message via a key or switch 36 as it is displayed on the display 38. The decoder/controller 28 is responsive to the marking of a message as a priority by adding or copying the marked message to the Priority Message List 52. As described in detail below with respect to FIG. 4, the user may also set the contents of the Priority Message List 52 by using one or more of the switches 36 to directly enter into the device 14 alpha-numeric characters forming a message. Setting the contents of the Priority Message List 52 is not limited to the above mentioned implementations and could be accomplished in other ways such as remote keyboard entry of the priority messages, etc. as will be apparent to one of ordinary skill in the art.

The controller/decoder 28 includes a CPU (central processing unit) 46. The CPU 46 controls the manner in which messages may be marked as a priority and the response of the selective call receiving device 14 to received messages in accordance with software routines stored in a ROM (read only memory) 54 as well as information stored in the RAM 48. It is noted that the ROM 54 may be, for example, a PROM (programmable read only memory) or an EEPROM (electrically erasable programmable read only memory). The RAM 48 is utilized to store variables derived during processing, as well as received messages in the Received Message List 50 and priority messages in the Priority Message List 52 as described above. The number of messages that can be saved in the lists 50 and 52 at any given time depends on the size of the RAM 48. Preferably each list will have room for sixteen messages but room for only one message on each list would be sufficient to practice the present invention. Each of the lists 50 and 52 may be formed, for example, as a FIFO (first in first out) type of list so that when a list is full, the oldest message contained in the list will be deleted by the next message to be added thereto. The decoder/controller 28 includes a display driver 40 coupled to the CPU 46 and display 38 for driving the display 40. An oscillator 42 generates timing signals that are coupled to a timer/counter 44. The timer/counter 44 provides a programmable timing function that is utilized in controlling the operation of the receiver 26 and/or the CPU 46 as well known in the art.

Figure 3:
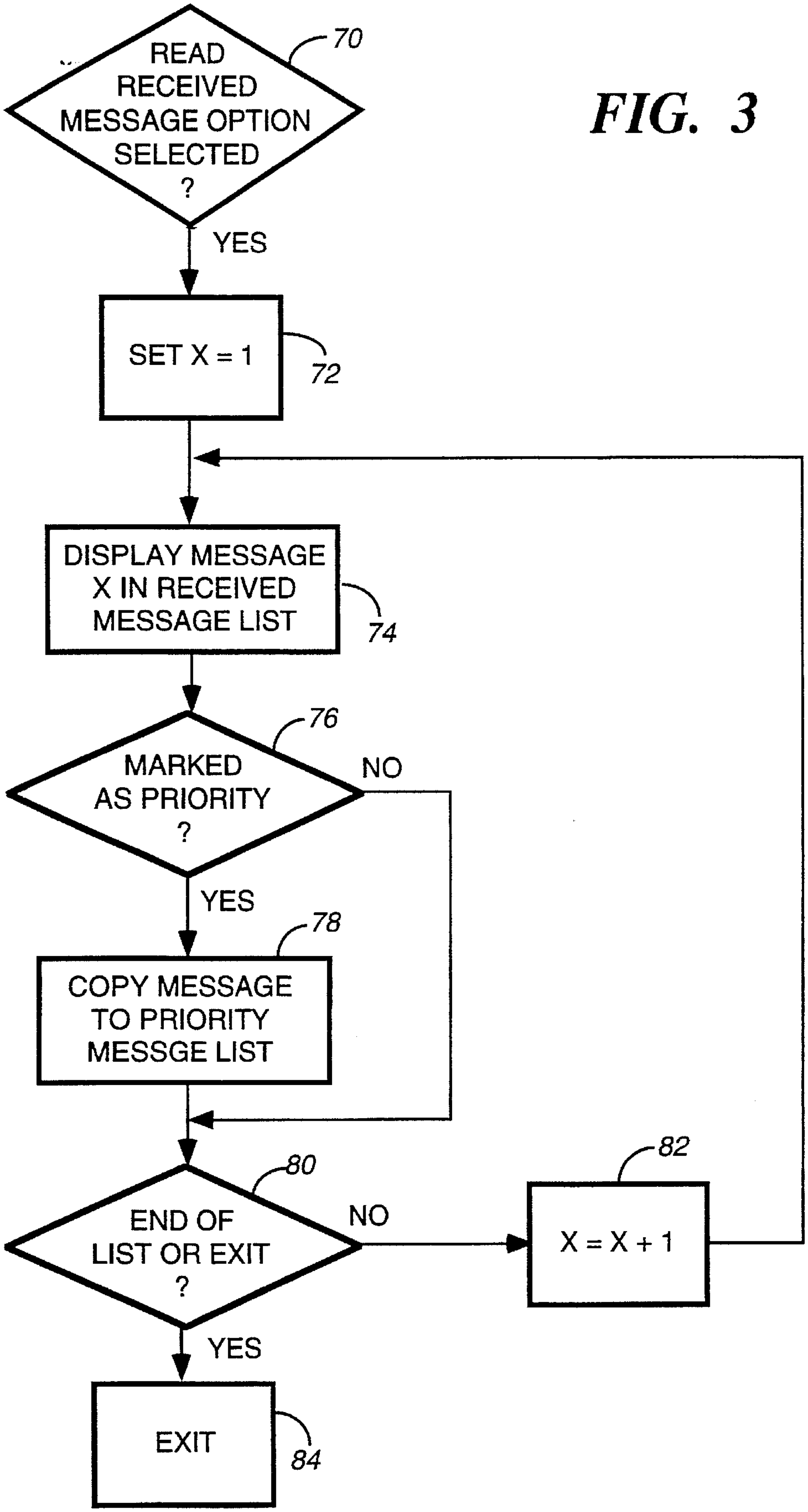
FIG. 3 is a flow chart illustrating a software routine executed by the controller of the selective call receiving device for adding a received message to a priority message list.

The software routine shown in FIG. 3 is executed by the CPU 46 to allow a user to mark a received message as a priority message. In accordance with this routine, the CPU 46 at block 70 determines whether a read option is selected. If so, at block 72 the CPU 46 initializes a pointer variable X by setting it equal to 1. Thereafter at a block 74, the CPU displays message X contained in the message list. The CPU 46 determines at block 76 whether the message X has been marked as a priority by the user actuating one of the keys or switches 36. If the message has been marked by the user as a priority, the CPU 46 at block 78 copies the message from the Received Message List 50 to the Priority Message List 52. If the CPU 46 determines that the message is not marked as a priority at block 76, block 78 will be bypassed. At block 80 the CPU 46 determines if it has reached the end of the Received Message List 50. If not, at block 82 the pointer X is incremented by one and the next message in the Received Message List is displayed at block 74. If the end of the Received Message List 50 is detected at block 80, the CPU 46 exits the software routine at block 84. It is noted that a user selectable function may be provided to allow the user to exit the routine any time that he desires to do so.

Figure 4:
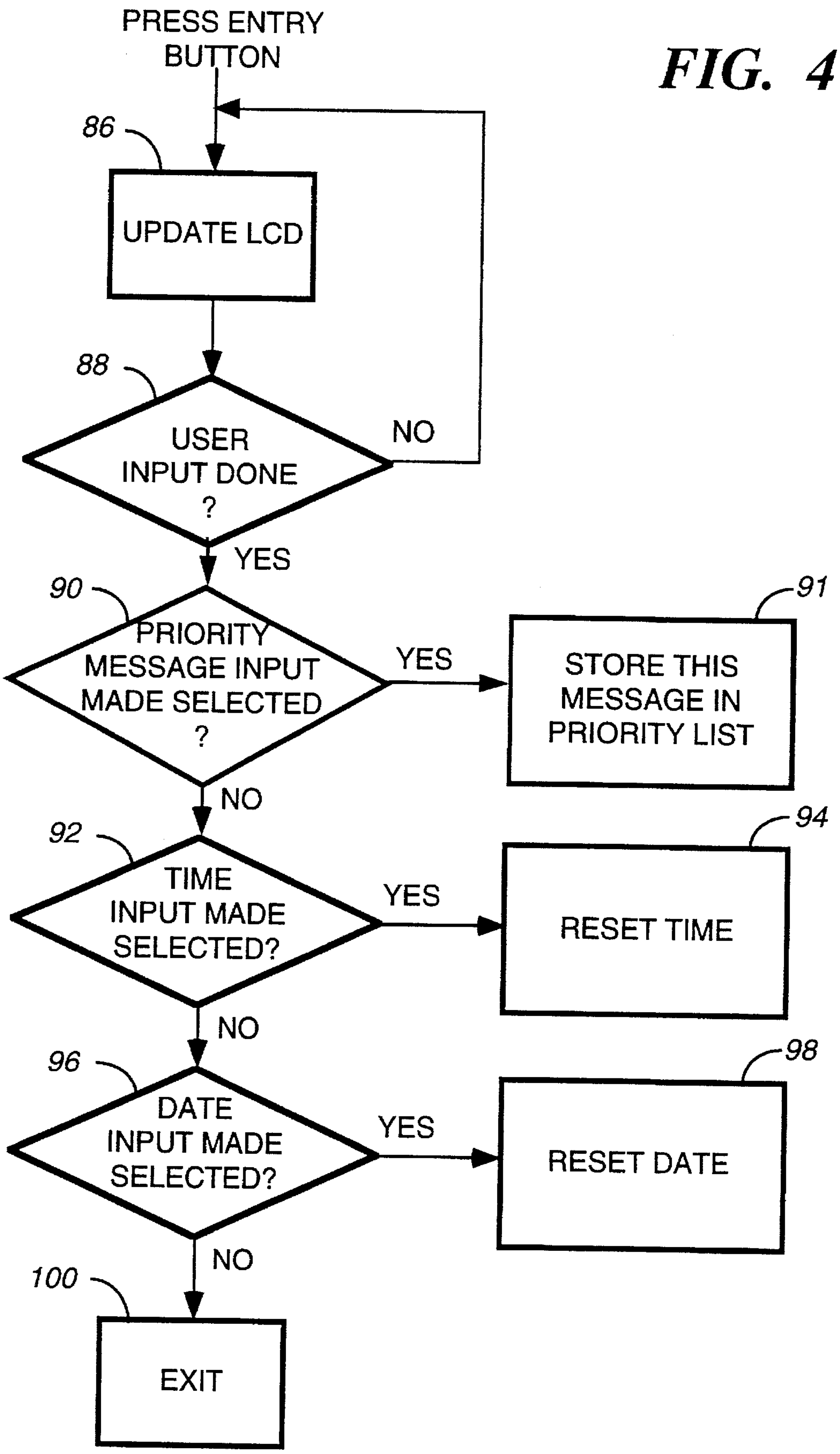
FIG. 4 is a flow chart illustrating a software routine executed by the controller of the selective call receiving device for adding user input messages to the priority message list.

The software routine shown in FIG. 4 is executed by the CPU 46 to allow a user to directly enter a priority message using the switches 36, a remote keyboard or other data entry device. As data is entered via the switches 36, the CPU 46 updates the display 38 at block 86. At block 88 the CPU 46 determines whether the user input is complete. If so, at block 90 the CPU 46 determines if the priority message mode has been selected by the user. If the priority message mode has been selected, the CPU at block 91 stores the entered data in the Priority Message List 52. If the priority message mode was not selected, the CPU 46 will use the entered data for other functions. Specifically, if the set time mode has been selected by the user as determined by the CPU at block 92, the CPU 46 resets a time value at block 94 in accordance with the entered data. If a set date mode has been selected by the user as determined by the CPU 46 at block 96, the CPU resets the date at block 98 in accordance with the entered data. The CPU thereafter exits the routine at block 100.

Figure 5:
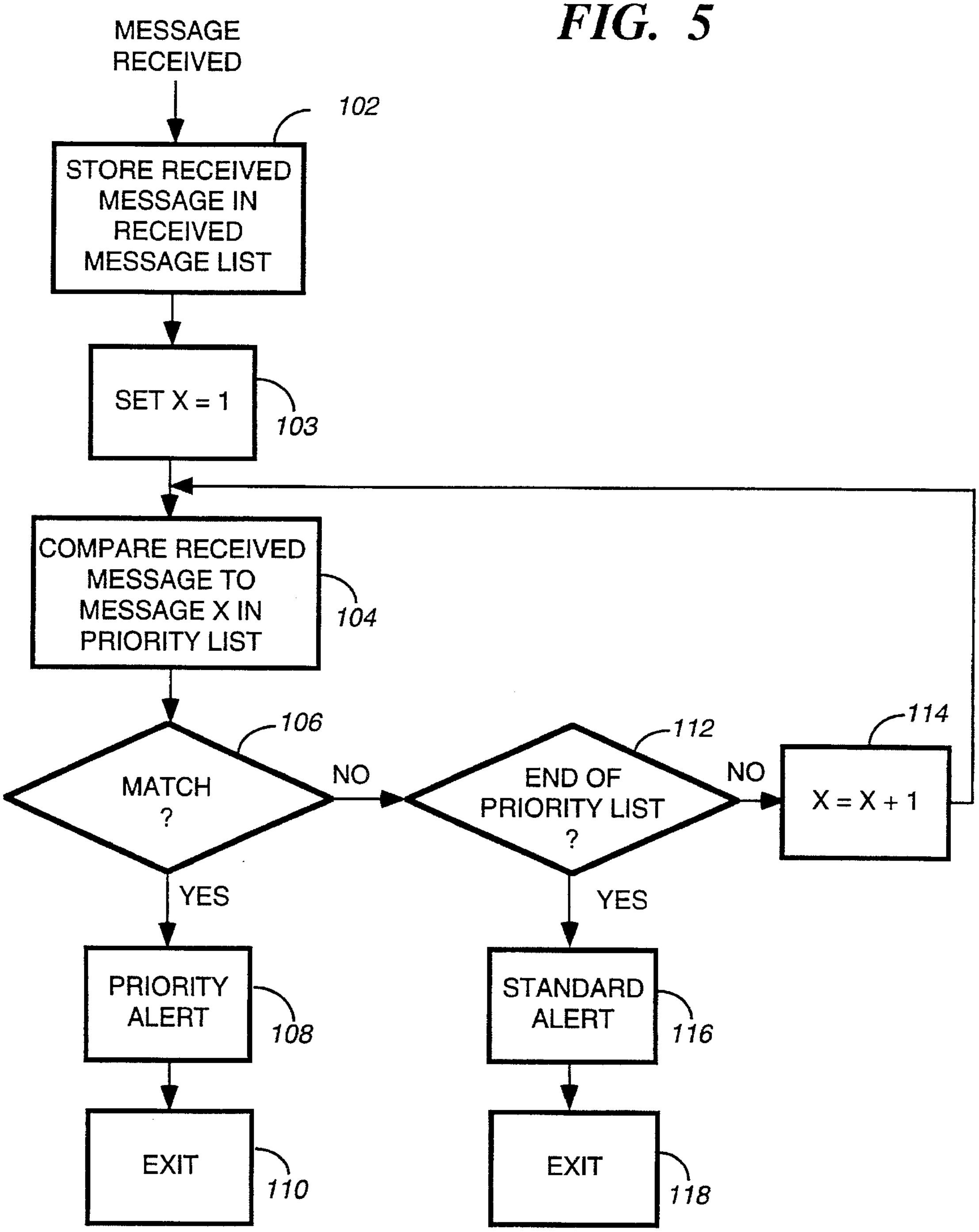
FIG. 5 is a flow chart illustrating a software routine executed by the controller of the selective call receiving device for determining whether a received message is a priority message or not.

The CPU 46 executes the software routine of FIG. 5 to determine if a received message is a priority message and to implement a priority response if the message is determined to be a priority. At block 102 the CPU 46 stores a received message in the Received message List 50. The CPU 46 sets at block 103 a pointer variable X equal to 1 to initialize the routine. Thereafter at block 104 the CPU 46 compares the received message to the priority message at the X (or first in this case) location in the Priority Message List 52. The CPU 46, at block 106, then determines whether there is a match between the received message and the priority message X. A match may be determined based on a one-to-one correlation between every alpha-numeric character in the messages. Alternatively a match may be determined based on a correlation of only a predetermined number of the received characters or based on a correlation between a certain portion of the message. If a match is found, the CPU 46 implements at block 108 a priority response such as a priority alert, thereafter exiting the routine at block 110.

If no match is found by the CPU 46 at block 106, the CPU 46 proceeds to block 112 to determine whether the end of the Priority Message List 52 has been reached. If the end of the list 52 has not been reached, the pointer X is incremented by one at block 114 and the next message in the Priority Message List 52 is compared to the received message at block 104. If the end of the Priority Message List 52 has been reached, the CPU 46 implements a standard alert at block 116 and then exits the software routine at block 118.

The selective call receiving device 14 in accordance with the present invention allows the user of the device 14 to mark messages as a priority. Thus, the user, as opposed to only the caller initiating the page, has control over whether a message is to be given a priority response or not.

Many modifications and variations of the present invention are possible in light of the above teachings. Thus, it is to be understood that within the scope of the appended claims, the invention may be practiced otherwise than as described above.

What is claimed is:

1. A selective call receiving device, comprising:

a receiver for receiving messages;

a display, coupled to the receiver, for displaying received messages;

a key operable by a user for enabling the user to designate the received messages individually as a priority message;

a memory, coupled to the receiver for storing the priority message in a priority memory space reserved for priority messages;

a controller having a comparator for comparing subsequently received message individually with the priority message to determine if the subsequently received message is a priority message.

2. A selective call receiving device as recited in claim 1 including at least one key operable by a user for entering a priority message to be stored in the priority memory space reserved for priority messages.

3. A selective call receiving device as recited in claim 1 including means operable by a user for adding a priority message to the priority memory space.

4. A selective call receiving device as recited in claim 1 wherein the selective call receiver is responsive to only a single paging address.

5. A selective call receiving device comprising:

a receiver for receiving a signal including an address and a message;

a memory for storing the address;

a comparator for comparing the address in the received signal to said stored address to determine whether the received signal was intended for said selective call receiving device;

a switch coupled to the memory for enabling a user to mark the message individually as a priority message;

means for storing a list of priority messages;

means responsive to a determination that the received signal was intended for said selective call receiving device for comparing a subsequently received message in the received signal to the list of priority messages individually to determine whether the subsequently received message is a priority message.

6. A selective call receiving device as recited in claim 5 including means operable by a user for adding a message to the list of priority messages.

7. A selective call receiving device as recited in claim 5 wherein the list of priority messages includes a plurality of priority messages.

8. A selective call receiving device as recited in claim 5 including:

means for storing received messages in a received message list;

means operable by a user for identifying a received message in the received message list as a priority message; and means for adding a received message identified as a priority message to the list of priority messages.

9. A selective call receiving device comprising:

a receiver for receiving messages;

a user operated switch for individually identifying a received message as a priority message a memory for storing the priority message in a priority message list;

means operable by a user for adding a message to the priority message list; and a comparator for comparing a received message individually to priority messages in the priority message list to determine whether the received message is a priority message.

10. A selective call receiving device as recited in claim 9 wherein the adding means includes at least one key operable by a user for entering a priority message into the device.

11. A selective call receiving device as recited in claim 9 including means for generating a priority response in response to a determination that the received message is a priority message.

12. A selective call receiving device as recited in claim 11 wherein the priority response is a priority alert.

13. A method of controlling a selective call receiving device response to a received message, comprising:

receiving a message;

designating a received message by a user individually as a priority message;

storing a priority message in a priority message list;

comparing a received message to the priority message list to determine individually whether the received message is a priority message; and generating a response indicative of the determination that the received message is a priority message.

14. A method of controlling a selective call receiving device as recited in claim 13 including the steps of:

storing a received message in a received message list;

identifying a received message in the received message list as a priority message; and adding a message identified as a priority message to the priority message list.

15. A method of controlling a selective call receiving device as recited in claim 13 including the step of displaying a received message.

16. A method of controlling a selective call receiving device as recited in claim 13 including the step of adding a message to the priority message list.

* * * * *